Feb. 5, 1957     O. WITTEL     2,780,133
CONTINUOUS FEED MOTION PICTURE PROJECTOR
Filed Aug. 8, 1952     3 Sheets-Sheet 1

OTTO WITTEL
INVENTOR.

BY Daniel I. Maynes,
Harold F. Bennett

ATT'Y & AG'T

Feb. 5, 1957     O. WITTEL     2,780,133
CONTINUOUS FEED MOTION PICTURE PROJECTOR
Filed Aug. 8, 1952     3 Sheets-Sheet 2

OTTO WITTEL
INVENTOR.

BY *Daniel J. Mayne*

*Harold F. Bennett*
ATTORNEY & AGENT

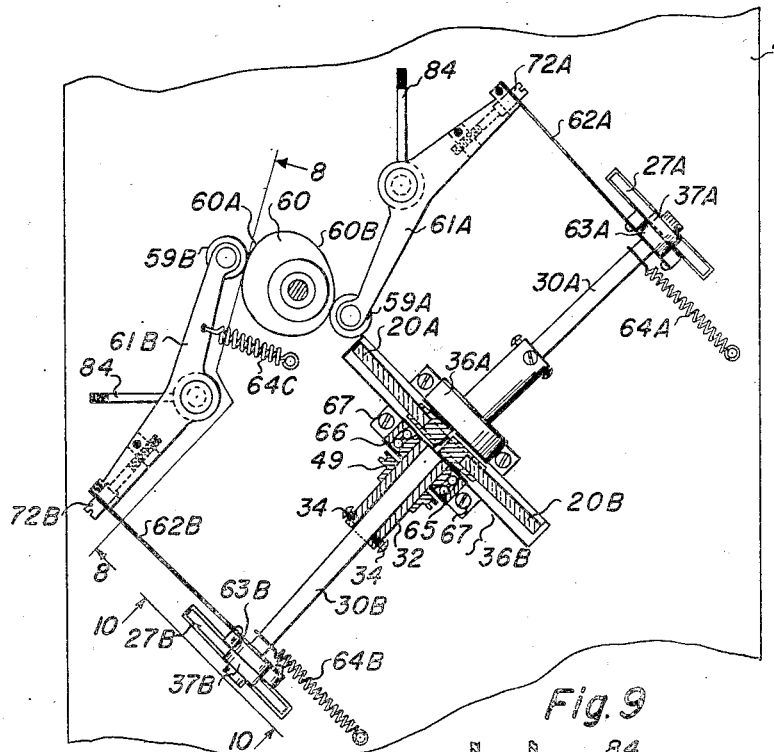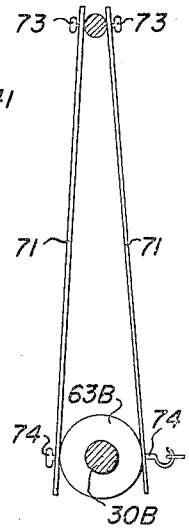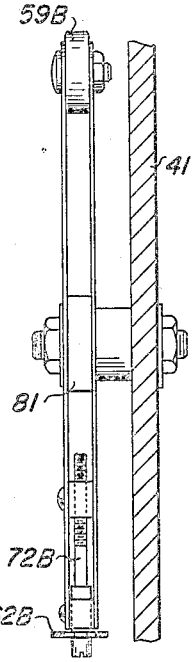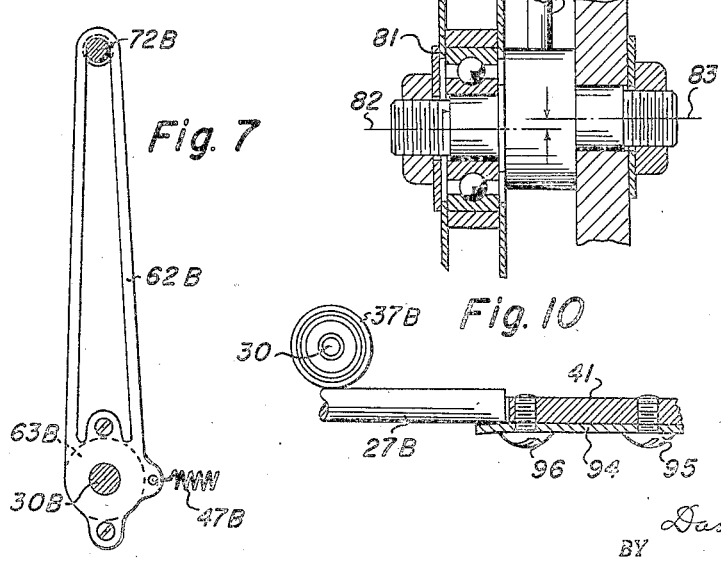

United States Patent Office 2,780,133
Patented Feb. 5, 1957

2,780,133

CONTINUOUS FEED MOTION PICTURE PROJECTOR

Otto Wittel, Rochester, N. Y., assignor to Eastman Kodak Company, Rochester, N. Y., a corporation of New Jersey Application August 8, 1952, Serial No. 303,230

2 Claims. (Cl. 88—16.8)

This invention relates to the projection of motion pictures from continuously moving film and particularly to the use of such projection in television broadcasting.

The object of the invention is to provide a continuous feed motion-picture machine which is relatively inexpensive to build and which provides the high degree of accuracy required in television transmission from motion picture film.

It is a further object of the invention to provide a motion-picture machine, the speed of which can be varied with respect to the speed of scanning for television projection.

It is a particular object of the invention to provide such a machine in which the effects of mechanical wear are minimized and can be compensated by manual adjustment.

It is an object of a preferred form of the invention to provide such a machine in which the change-over from one frame to the next takes place without a dark boundary passing across the picture and without any appreciable decrease in total illumination, whereby the brightness of the scanning spot is substantially independent of the phase of the film advance.

The projection of motion pictures from continuously moving film and making use of moving optical parts to cause the image to stand still on the screen has been a dream of inventors for more than 50 years. In all that time, only one machine has had any degree of commercial success, a German-made machine which depended for its satisfactory operation upon the very fine workmanship of the German machinist, the cost of which would be prohibitive under present-day conditions.

Many arrangements for optical compensation have been proposed. In some cases the optical compensation was not exactly uniform with the film feed or the image went in and out of focus or a variation in perspective, known as keystoning, appeared. Usually, if the optical rendering is perfect the optical system is limited to very small relative apertures or it is necessary to provide a number of identical lenses or identical cams or the required accuracy of the mechanical motion is beyond the practical capabilities of present-day machine shop practice. Known optical compensators fall into several readily recognized classes. The one to which the present invention pertains has a tilting mirror type of optical compensator, and preferably it has a projection lens and a curved film gate substantially at the back focal point of the projection lens, the gate being flat across the film and curved along the length of the film with its center of curvature substantially at the rear nodal point of the projection objective.

According to the present invention a continuous feed motion-picture projector is made up comprising a curved film gate, means for feeding film through the gate at a steady rate, a projection lens system forming an image of the film gate, preferably a greatly enlarged image, a pair of semicircular plane mirrors in front of the projection lens and oriented diagonal to the axis of the projection lens whereby the image is thrown to one side of the axis of the lens, the mirrors being perpendicular to a plane called the base plane which passes through the axis of the lens and along the center of the film gate in the direction of travel of the film. The mirrors are individually mounted on the adjacent ends of two rotatable shafts arranged end to end in a plane parallel to and to one side of the base plane by more than half the diameter of the projected light beam. This plane in which the two rotatable shafts lie will hereinafter and in the appended claims be referred to as the plane of tilt. The adjacent ends of the two shafts are held stationary while the outer ends are tilted back and forth by cam means and at the same time the two semicircular mirrors are rotated so that they alternately intercept the beam of light, the rate of roation being one revolution for each two frames of the motion-picture film. This brings one mirror into the light beam for each successive frame of the motion-picture film. While each mirror is partly or completely in the beam, the cam imparts to it a uniform tilting motion at an angular rate equal to half the apparent rate of advance of the film as subtended at the rear nodal point of the projection lens. This causes the image in the mirror to remain stationary while the film is advancing. It will be noted that each mirror is in the beam of light during more than 180 degrees rotation; in practice, this is about 240 degrees.

In order that the angular rate of advance of the film may be the same for all points in the film gate, I prefer to have the film gate curved concave toward the projection lens in the direction of travel of the film and flat in the transverse direction. Then, in order to have the image in focus throughout the length of the film gate, I use a projection lens which has an inward curving field approximating the curvature of the film gate. Optionally, the film may also be made to appear concave in a transverse direction by providing a field lens adjacent to and just in front of the film gate, the field lens being curved to lie along the length of the film gate and having a transverse section which is flat on the side next to the film and concave on the side facing the projection lens.

According to a preferred feature of the invention, the two adjacent ends of the tilting shafts are held stationary and rotatable by being mounted in universal ball bearings. The inner ring of these bearings is attached to the shaft itself and the outer ring is fixed in a stationary mounting. The inner ring is formed in the shape of the equatorial zone of a sphere and the inner surface of the outer ring is likewise formed in the shape of the equatorial zone of a hollow sphere, the clearance between the two matching the diameter of the balls. Preferably two rows or circles of balls are inserted between the two rings and retaining walls and ball separators are provided to keep the balls in place. It may be observed that this bearing is similar to self-aligning bearings but is more universal. It also has some of the characteristics of thrust bearings, and possible play in the bearing is effectually taken up by providing a small amount of thrust either by gravity or by spring action. The bearing has the effect of permitting the shaft to tilt in any azimuth or in any direction freely while it is rotating. I have found that the so-called self-aligning bearings allow a small degree of tilting but that they tend to bind when the tilting during rotation is as rapid as is necessary in the present invention.

Cooperating with the universal bearings, a flat guide is provided at the outer end of each shaft for keeping the shaft in the plane of tilt and the shaft is spring-urged against this flat guide. Preferably, a small ordinary ball bearing is provided on the outer end of each shaft for rolling on the flat guide while the shaft is rotating and in order to reduce the friction.

According to another preferred feature of the invention, a single cam is provided for giving the tilting motion to both shafts. This cam is positioned symmetrically to the two shafts and hence substantially at the intersection with the plane of tilt of the median plane of the mirrors and to one side of the shafts. For transmitting the motion from the cam to the shafts, two rocker arms with cam followers are provided, one operating on the mirror side of the cam and the other on the far side. At a point on each arm opposite the outer end of the corresponding shaft, a link or pair of links is attached connecting the arm with the shaft. The fulcrum of the arm is an axis parallel to the axis of tilt and its distance from the cam follower is preferably between 1 and about 5 times its distance from the point of attachment of the links. It will be obvious that the fulcrum can be between the two points mentioned or in some cases it can be beyond the point of attachment of the link.

In order to reduce the weight of the reciprocating system as much as possible, the links are made of thin flexible steel which works well under tension and are attached to two pins on opposite sides of the outer ring of an ordinary ball bearing which is mounted on the shaft near its outer end. Spring tension is applied to the shaft pulling in a direction opposite to the pull of the links. It will be noted that this spring tension serves also to hold one of the cam followers against the cam, but that in the case of the other a relatively strong spring must be applied to the rocker arm opposing the link-tensioning spring.

I find it preferable to provide a third ball bearing on the outer end of each shaft and to apply the spring tension to this third ball bearing rather than to the opposite side of the second ball bearing. The reason for this will be self-evident, namely, that it will take up the play in the two ball bearings.

The specific method of mounting the tilting mirrors is useful in any of the known systems of projection employing tilting mirrors at any of various points in the optical system wherein the axis of tilt intersects or substantially intersects the axis of rotation of the mirrors.

In the accompanying drawings:

Fig. 6 is a more detailed view of the mirror rotating and tilting means.

Fig. 7 is a detail showing one form of the link.

Fig. 7A is a detail of another form of the link.

Fig. 8 is an edge view of a rocker arm.

Fig. 9 is a detail of the adjustable mounting of the fulcrum of the rocker arm.

Fig. 10 is a detail of the rail and roller at the outer end of one of the shafts.

Figure 1:
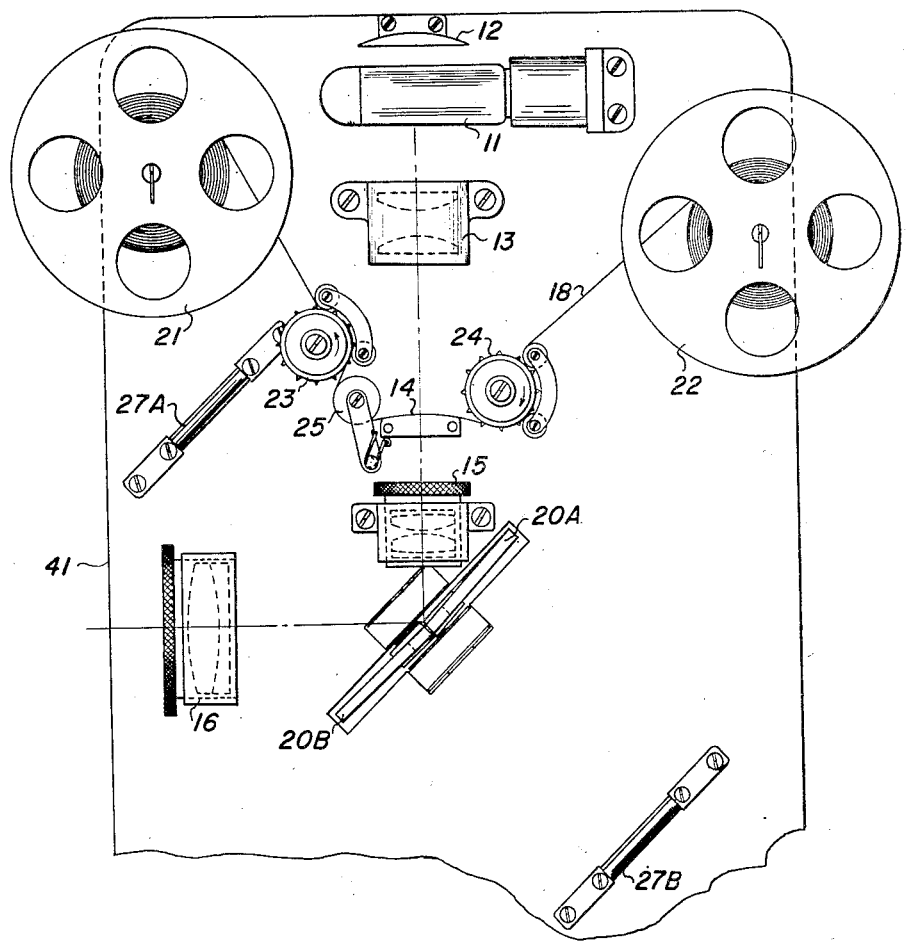
Fig. 1 shows a left side view of a projector according to the invention.
Figure 2:
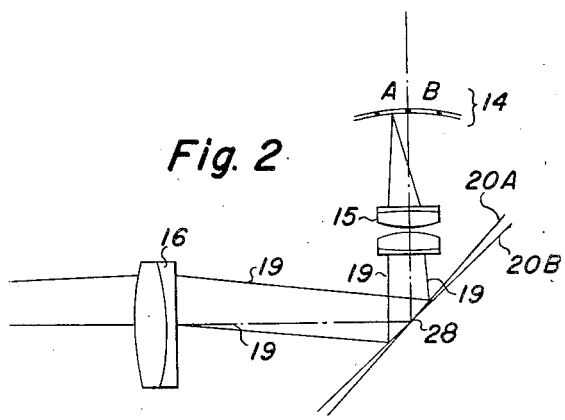
Fig. 2 is a diagram showing the optical principles involved.

In Fig. 1 light from a light source 11, preferably reinforced by a mirror 12 is focused by a condenser system 13 and directed through the film gate 14 to the projection lens 15 and on through the projection lens to form the projection beam 19 indicated in Fig. 2. The projection beam strikes one or both of the mirrors 20A and 20B and is reflected off to one side at substantially 90 degrees. When the projected image is to be focused on a screen at a distance less than about 50 or 100 times the focal length of the projection lens a supplemental lens 16 is preferably provided, the focal length of which is substantially equal to the distance to the screen, for focusing the substantially parallel beam upon the screen.

The film 18 is advanced through the film gate by sprocket wheels 23 and 24 having the usual structure and is tensioned by a roller 25 which is spring-urged against the film. The usual film spools 21 and 22 are provided for feeding and taking up the film. To simplify the drawing, the lamp is shown directly behind the condenser although, as is well known, filament lamps generally must be mounted base down and hence a diagonal reflector would be necessary unless the whole projector is rotated 90 degrees and the projected image either thrown upward or reflected through another diagonal mirror.

Fig. 2 is an optical diagram showing the optical principles involved in the invention and broadly in all projectors of the tilting mirror type. Broadly the principle involved is as follows: while one frame of the motion-picture film is advancing through the gate 14 from position A to position B, a mirror is rotated from position 20A to position 20B. The axis of tilt or center of rotation of the mirror may be thought of as being at the center of the mirror, at point 28, for purposes of explanation; for mechanical reasons, however, it will be seen that it is preferable to have the axis of tilt slightly in front of one mirror and slightly behind the other. Various projection systems have been proposed in which the tilting mirror is between the projection lens 15 and the film gate 14, or faces directly toward the objective 15 with a slight permanent tilt around an axis lying in the plane of the diagram in order to throw the image back through the lens 15 to a position either in front of or behind the plane of the diagram. The specific mechanism for tilting the mirrors described in more detail below is useful in any of these arrangements. A study of the prior art systems in which the mirror is behind the projection lens 15 will show that having the axis of tilt in front of or behind the mirror or to one side of the center of the light beam introduces a slight out-of-focus effect, and furthermore, the film gate must be more strongly curved so that its center of curvature is at the center of the mirror rather than at the rear nodal point of the lens. Moreover, during the changeover a boundary shadow passes across the screen which is out of focus but which nevertheless is very undesirable, especially in scanning systems for television since it almost completely darkens the scanning spot for a moment and gives rise to stroboscopic effects which make the shadow persist on the screen. For these reasons I prefer to position the tilting mirrors in parallel or substantially parallel light and near the aperture stop, that is, in front of the objective or within the optical system. It may be seen from Fig. 2 that in the optical arrangement shown therein, in which parallel light rays 19 are reflected at the mirror 20A, a lateral displacement of the mirror parallel to itself results only in a different set of parallel rays passing through a different part of the lens aperture and does not cause any out-of-focus effects.

Figure 3:
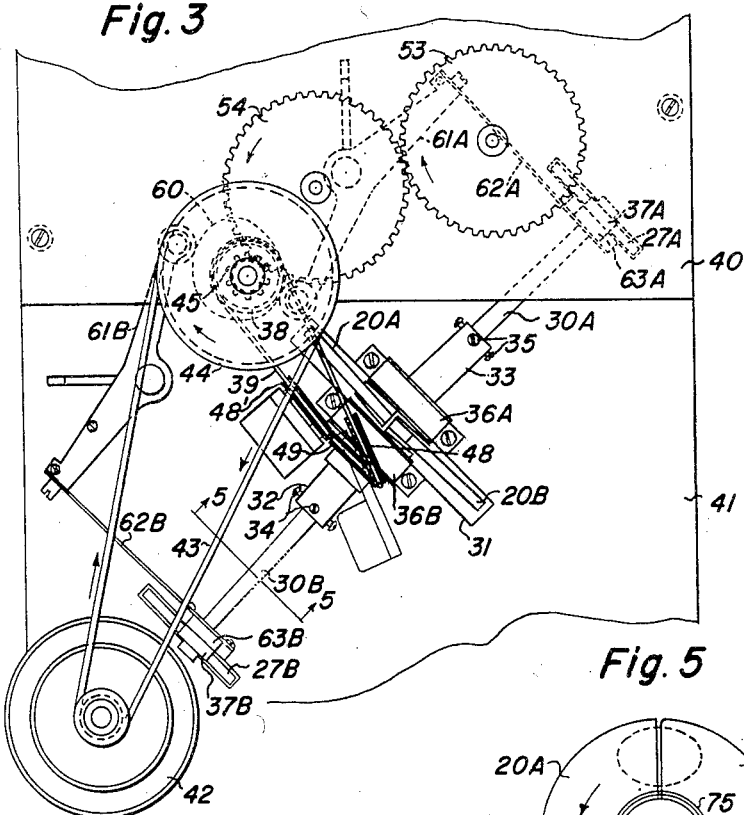
Fig. 3 is a right side view of the projector.
Figure 4:
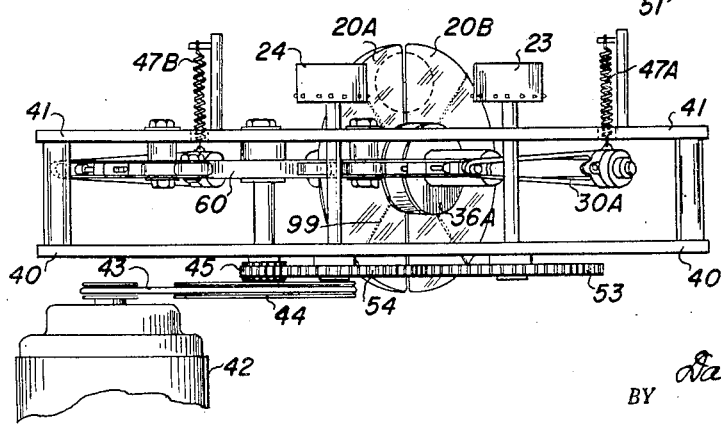
Fig. 4 is a plan view of the projector.

Considering Fig. 3 and Fig. 4 together, showing the right side and plan views of the mirror tilting and rotating mechanism, the two mirrors 20A and 20B are mounted respectively on the ends of the shafts 30A and 30B and extend through the slot 31 in the plate 41. For purposes of adjustability, the mirrors are not mounted directly on the shafts 30A and 30B but are mounted on collars 32, 33, which are adjustable relative to the shafts by screws 34, 35, to control the tilt in both directions. The shafts are mounted in bearings 36A and B at the adjacent ends and 37A and B at the outer ends. The bearings 36 will be described in more detail in connection with Fig. 6. The bearings 37A and B are spring-urged against the flat guides or rails 27A and B by springs 47A and B (Fig. 4). For simplicity, the rails 27A and B are omitted from Fig. 4. A drive means such as electric motor 42 drives a pulley wheel 44 through a flexible belt 43. Pinned on the same shaft with pulley wheel 44 are a spur gear 45, a gear pulley 38 (omitted from Fig. 4) and a cam 60 to be described more fully with reference to Fig. 6. A flexible cog belt 39 is driven by pulley 38 and runs over idlers 48, 48' and drives gear pulley 49 pinned to the collar 32 on the shaft 30B. This gives the mirror 20B the required rotation. The preferred method of rotating the other mirror is described with reference to Fig. 5. The pinion 45 drives a larger spur gear 54 pinned to one sprocket wheel shaft, and spur gear 54 in turn drives an identical spur gear 53 which is pinned to the other sprocket wheel shaft. This provides the motive power for the film drive shown in Fig. 1. It may be pointed out that the rotation of the mirrors does not need to be in perfect synchronism with the film drive but can range a few degrees of rotation ahead of or behind the timing of the film. With this in mind I find it convenient to use as a drive belt 39 for the rotation of the mirrors a commercially available rubber cog belt having enlargments or nodules at short intervals of a quarter or half-inch. The nodules are designed to drop into pits (not shown) provided in the gear pulleys 38 and 49 to prevent gradual creep of the belt along the pulleys but at the same time the elastic stretch of the belt permits a little trailing or advancing of the mirror shafts behind or ahead of the rotation of the pulley 38. In this way a smoother running mechanism is obtained. The mechanism for tilting the mirrors is shown more clearly in Fig. 6 and will be described in connection therewith.

Figure 5:
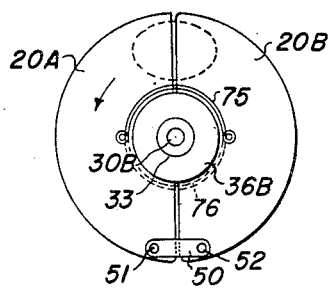
Fig. 5 is a rear view of the two semicircular mirrors, taken diagonally upward with reference to Fig. 1.

Fig. 5 shows a rear view of the mirrors 20A and B at that stage of rotation when 20A is just leaving and the mirror 20B is just entering the optical beam indicated by the dotted ellipse. It will be remembered from the description of Fig. 3 that the rotational drive is applied to the shaft holding mirror 20B. I prefer to drive mirror 20A by a universal joint between shafts 30A and 30B rather than by duplicating the cog belt drive. A novel and very effective universal joint for the present purposes is provided by attaching a link 50 between mirror 20B and mirror 20A at one pair of corners thereof by means of pins 51 and 52 which can be actually put through holes bored in the glass of the mirrors. It will be remembered that the mirrors must be free to tilt relative to each other about an axis perpendicular to their common edge, and that if one mirror gets ahead of the other in rotation by even a few degrees, these edges will tend to overlap or have friction between them and interfere with the tilting motion. By providing a universal joint of the form shown, the relative angular position of the mirrors is maintained almost perfectly constant. The link 50 of course must fit rather loosely over the pins 51, 52.

I have found that a great improvement in the smoothness of operation of the tilting mechanism is gained by compensating the centrifugal force of the two rotating mirrors by spring tension. In Fig. 5 two clip springs 75, 76 are shown, a form of spring which has proven very satisfactory for this purpose. I find it best to attach one spring in front of the mirrors and one behind.

Fig. 6 shows in greater detail the mirror tilting mechanism shown in Fig. 3 and 4. The cam 60 is cut with a uniform rise 60A through about 240° and a quick smooth return 60B through the rest of 360°. The two rocker arms 61A and 61B are rocked about their pivot by the cam as it rotates, the cam follower 59A on arm 61A lying between the cam and the mirrors and the other cam follower 59B lying on the opposite side of the cam. The other end of each arm extends beyond the fulcrum approximately to a point directly opposite the end of the corresponding shaft 30A or 30B. Loosely attached to the end of each lever and extending across to the corresponding shaft, are links 62A and 62B. These links are shown in more detail in Fig. 7 and are made of very light material which has good tensile strength but which should not be very stiff because of the bending which will take place due to the rocking of the shaft and the rocker arm. Optionally, the rocking arms lie in straight lines parallel to the median position of the corresponding shaft, in which case link 62A is shorter than link 62B. I prefer, however, to make each rocker elbow-shaped and to position the pivots of the two rockers on a straight line through the axis of the cam and parallel to the median position of the mirror shafts. The outer ends of the rockers then extend along this same straight line when the mirrors are in their midway positions and the cam ends of the rockers deviate from this straight line sufficiently to place the cam followers at the periphery of the cam. In this way the two links 62A and 62B are made of equal length and the bending thereof during the operation of the projector is a minimum.

In projectors for 16 mm. film I find that a good compromise between the optical and mechanical errors is obtained when a two inch projection lens is used and the two ends of the rocker arm are roughly equal in length or the cam end somewhat longer or when a three inch lens is used and the cam end of the rocker is from one and one-half to three times as long as the other end. However longer focal lengths and arm ratios up to about five are useful. It may be mentioned that the fulcrum of the rocker arm can be positioned beyond the point of attachment of the link if desired when the arms are of unequal length.

In the lower center part of Fig. 6, one of the universal bearings 36B is shown in section. The mirror 20B is attached to the end of the collar 32 through which the shaft 30B is inserted. The collar fits snugly on the shaft at the end next to the mirror but has a taper so that it is loose at its other end whereby the angle of the mirror may be very nicely adjusted by the adjusting screws 34. The inner ring of the universal bearing has a snug fit over the end of the collar 32 next to the mirror. This inner ring is shaped in the form of the equatorial zone of a sphere. The outer ring 66 is provided with an inner face which is also of the form of the equatorial zone of a sphere, the radius of curvature of which is larger by the diameter of the balls. Two rows of balls 65 in separators are placed into the race thus formed and retaining washers are put on both faces of the bearing to limit the tilting. The outer ring of the bearing is mounted in a bracket held by screws 67 against the base plate 40 of the projector. It will be seen that while the shaft and collar 30B and 32 are rotating, the other end of the shaft is free to tilt through a considerable angle in any direction. Accordingly, the adjustable guide 27B is provided to confine it to the plane of tilt and the mechanism which has just been described is provided for tilting it in that plane.

To maintain tension in the link 62A and to hold the associated cam follower against the cam, a spring 64A is provided which pulls on the shaft 30A opposite to the link 62A. A similar spring 64B is provided on shaft 30B to tension the link 62B but since this spring tends to pull the associated cam follower away from the cam, a stronger spring 64C is provided on the rocker arm holding the cam follower. Preferably the springs 64A and B are attached to the shafts by another roller bearing (not shown) adjacent to the bearing to which the link is attached.

To summarize, the mirrors are driven to rotate at the same average speed as the cam and each mirror is tilted back and forth by the cam once during each revolution, the two mirrors being 180° out of phase. While each mirror partly or wholly intercepts the projection beam, i. e. through about 240° of rotation, it is tilted at a uniform angular speed for making the image of one frame of film stand still, then quickly and with smooth acceleration and deceleration it is returned to its initial angle of tilt while the other mirror is in the beam.

Fig. 7 is a detail of one form of the link 62B. This is made of thin flexible spring steel and is hooked over the head of a screw 72B at the end of the rocker arm and is attached to the ball bearing on the mirror shaft at two points by screws. Conveniently, the spring 47B holding the mirror shaft against the flat guide 27A or B is attached to a wing on this link. The length of the rocker arm is easily adjustable by means of the adjusting screw 72A or 72B on which the link is hooked.

Fig. 7A shows an alternative form of the link in which the bending of the spring during each oscillation of the mirror is avoided. Instead of a single piece, it is actually twin links 71 pivoted to the rocker arm on pins 73 and pivoted on the ball bearing 63B by pivots 74.

Fig. 8 shows an edge view of one of the rocker arms 61B showing the method of attaching the cam follower 59B and the adjusting screw 72B. The lever is mounted on an eccentric bearing 81 which is supported on the base plate 41.

Fig. 9 shows the eccentric adjustable bearing 81 in section and shows the center line 82 of the bearing displaced from the center line 83 of the supporting pin. A handle 84 is provided which optionally is removable and by which the eccentric support for the bearing may be rotated while the machine is operating to adjust the rocker arm so that the two mirror images coincide.

Fig. 10 is a detail drawing partly in section of one of the flat guides or rails 27A and 27B which guides the shafts 30 so that they remain in the same plane. The shaft 30 is fitted with a ball bearing 37 which rolls on the rail 27. The guide may be a flat plate but I prefer a piece of drill rod which is supported on base plate 41 by a flat clip 94 which is attached by at least one screw 95 and is adjustable at the end supporting the rail by a screw 96. Since the two ends of the rail are independently adjustable, it can be adjusted into the plane of tilt so that the projected image does not weave from side to side.

Figure 11:
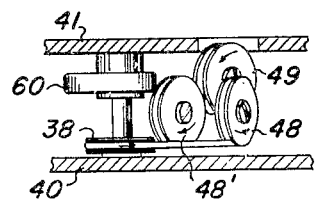
Fig. 11 is a detail of the belt drive for imparting rotation to the shafts.

Fig. 11 is a schematic plan view of the belt drive of the rotating mirror shafts, as shown in Fig. 3, showing the orientation of the idler pulleys 48. In order to show the belt drive more clearly, the shaft 30B is omitted from this drawing.

Although it is known to rotate a pair of semicircular mirrors and to tilt them independently during their rotation and although such systems appear to be among the simplest which have been proposed for continuous feed projectors, they have not been very successful heretofore because of certain drawbacks which the present invention overcomes. The chief drawback, perhaps, has been the amount of mass which has had to be tilted back and forth during each cycle of the machine. The present invention eliminates part of that mass by providing the universal ball bearings of novel design above described so that the outer ring of the bearing can be stationary while the inner ring both rotates and tilts. I have discovered that the so-called self-aligning bearings commercially available are quite suitable when the tilting motion is very slow but that the balls tend to bind on the sides of the races when the tilting action is rapid. In my universal bearings, however, the balls roll freely either around or across the race. Another way in which mass has been eliminated is by having the cam and the cam followers and the levers and the links all in the same plane with the rotating mirror shafts. In known systems two cams are placed to the side of the plane of tilt, and the mirror shafts are mounted in frames which are subject to twisting forces. Either the twisting introduces inaccuracies in the mirror motion or if heavy enough frames are provided to prevent twisting the oscillating mass causes bad vibration. By using very light weight links and levers which are rigid only in one plane, I have eliminated a great percentage of this oscillating mass, thus making the action of the rocking of the mirrors much smoother.

It will be clear that the above-described embodiment of the invention is exemplary only, and that further variations in details besides those mentioned fall within the scope of the invention which is as defined in the appended claims. For example, the advantages of the tilting forces being applied in the plane of the shafts is gained with or without the preferred feature of tilting both shafts by a single cam. Also, the guides for the ends of the shafts are preferably straight rails but could be made curved if desired in which case the mirrors are mounted out of perpendicular with the shafts.

And finally, it is advantageous to employ the known feature of having blocked out certain areas of the mirrors such as "spokes" (as shown at 99, Fig. 4) at every forty-five degrees, the line between the mirrors forming two of the "spokes," whereby at each instant at least one of the "spokes" is passing through the optical beam, or some equivalent arrangement of darkened areas is used whereby even the slight flicker caused by the line between the mirrors is eliminated.

I claim:

1. A continuous feed motion picture projector comprising a curved film gate, means for feeding film through the gate at a steady rate, a projection lens system including an objective lens having an axis of symmetry and adapted to receive light from film in the film gate and to project a greatly enlarged image thereof, the film gate being concave toward the lens in the direction of travel of the film and the axial plane intersecting the film gate in the direction of travel of the film being hereinafter designated as the base plane, a pair of semi-circular plane mirrors located in front of the objective lens, oriented perpendicular to the base plane and diagonal to the axis of the projection lens and adapted to intercept the projected light beam and to throw the projected image to one side of the axis of the objective lens, the mirrors being individually mounted on the adjacent ends of two rotatable shafts arranged end to end in a plane parallel to and displaced from the base plane by more than half the diameter of the projected light beam and hereinafter designated as the plane of tilt, bearing means substantially at the said adjacent ends of the shafts for maintaining a point in each shaft in a fixed position while permitting free rotation and tilting of the shaft, a bearing at the outer end of each shaft and a guide on which the bearing is adapted to roll and against which it is spring-urged for maintaining the shaft in the plane of tilt, a third bearing on each shaft near the outer end, a yoke attached to each said third bearing, two levers lying generally parallel to and on one side of the shafts substantially in the plane of tilt and individually associated with the shafts, a cam between the levers and located substantially at the median plane of the mirrors, one lever being closer to and one farther from the shafts than is the cam, a roller attached to one end of each lever adapted to roll against the cam face, a rod or strap connecting the opposite end of each lever to the yoke on the associated shaft, a fixed fulcrum between the two ends of each lever, spring means urging each roller against the cam, one on the side toward the shafts and one on the opposite side, and means for rotating the cam and the two shafts each one complete revolution during the advance of two frames of film past the gate, wherein the cam is shaped to have a uniform rise throughout somewhat more than 180° and a smooth fall during the remainder of 360°, the rate of rise of the cam and the lengths of the several lever arms being determined with reference to the focal length of the objective and the magnification of the image so that the angular rate of tilt of each mirror during the rise is one-half the angular rate of advance of the film as subtended at the rear nodal point of the objective lens.

2. In a continuous film feed motion picture projector of the type having an axially symmetrical projection lens in which the axial plane in the direction of travel of the film is hereinafter designated as the base plane, an optical compensator of the tilting mirror type comprising a pair of semi-circular plane mirrors perpendicular to the base plane and at an angle to the lens axis and adapted to intercept the projected light beam in front of the projection lens and to reflect it to one side of the axis of the projection lens, two rotatable shafts arranged end to end in a plane parallel to and displaced from the base plane by more than half the diameter of the projected light beam and hereinafter designated as the plane of tilt, the mirrors being individually mounted on the adjacent ends thereof, bearing means substantially at the said adjacent ends of the shafts for maintaining a point in each shaft in a fixed position while permitting free rotation and tilting of the shaft, a bearing at the outer end of each shaft and a guide on which the bearing is adapted to roll and against which it is spring-urged for maintaining the shaft in the plane of tilt, a third bearing on each shaft near the outer end, a yoke attached to each said third bearing, two levers lying generally parallel to and on one side of the shafts substantially in the plane of tilt and individually associated with the shafts, a cam between the levers and located substantially at the median plane of the mirrors, one lever being closer to and one farther from the shafts than is the cam, a roller attached to one end of each lever adapted to roll against the cam face, a rod or strap connecting the opposite end of each lever to the yoke on the associated shaft, a fixed fulcrum between the two ends of each lever, spring means urging each roller against the cam, one on the side toward the shafts and one on the opposite side, and means for rotating the cam and the two shafts each one complete revolution during the advance of two frames of film past the gate, wherein the cam is shaped to have a uniform rise throughout somewhat more than 180° and a smooth fall during the remainder of 360°, the rate of rise of the cam and the lengths of several lever arms being determined with reference to the focal length of the objective and the magnification of the image so that the angular rate of tilt of each mirror during the rise is one-half the angular rate of advance of the film as apparent from the mirror position.

References Cited in the file of this patent

UNITED STATES PATENTS

| | | |
|---|---|---|
| 1,085,392 | Riper | Jan. 27, 1914 |
| 1,401,345 | Mechau | Dec. 27, 1921 |
| 1,486,222 | Capstaff et al. | Mar. 11, 1924 |
| 1,842,255 | Deville | Jan. 19, 1932 |
| 2,456,403 | Goehring | Dec. 14, 1948 |

FOREIGN PATENTS

| | | |
|---|---|---|
| 8,062 | Great Britain | of 1913 |
| 49,219 | Norway | Apr. 7, 1931 |